United States Patent
August et al.

(10) Patent No.: US 6,265,463 B1
(45) Date of Patent: Jul. 24, 2001

(54) DEGRADATION OF EXPANDABLE POLYMER BEAD PRODUCTS

(76) Inventors: Algis P. August, 6637 Eastridge Road, Mississauga (CA), L5N 4L8; Casey P. August, 360 Riverside Ave., Greenwich, CT (US) 06878

( * ) Notice: Subject to any disclaimer, the term of this patent is extended or adjusted under 35 U.S.C. 154(b) by 0 days.

(21) Appl. No.: 09/696,321

(22) Filed: Oct. 25, 2000

(51) Int. Cl.$^7$ .................................. C08J 9/22; C08J 9/36; C08J 9/38

(52) U.S. Cl. .............................. 522/160; 521/53; 521/58; 521/60; 521/916

(58) Field of Search .............................. 522/160; 521/53, 521/60, 58, 916

(56) References Cited

U.S. PATENT DOCUMENTS

| | | | |
|---|---|---|---|
| 3,897,899 | * 8/1975 | Schuff et al. | 264/DIG. 9 |
| 3,959,189 | * 5/1976 | Kitamori | 521/56 |
| 5,616,413 | * 4/1997 | Shinozaki et al. | 521/56 |
| 5,783,612 | * 7/1998 | Batschneider et al. | 521/60 |

OTHER PUBLICATIONS

Developments in Polyme Degradation By N. Grassie Applied Science Publishers Ltd—pp. 207–225, 1981.*

Polymer Degradation & Stabilization—By Norman Grassie et al Cambridge University Press pp. 194 and 195, 1985.*

* cited by examiner

Primary Examiner—Morton Foelak (57) ABSTRACT

From an environmental viewpoint, it is desireable to cause degradation of expanded EPS beads and foam cups and other products formed from expanded EPS beads, which are composed of polystyrene and a blowing agent such as pentane. For this purpose, the present invention utlizes the pre-expansion step as an opportunity to initiate foam product degradation by treating the expandable polymer beads during their pre-expansion. The objective of this degradation treatment is to initiate degradation of at least the surfaces of individual beads during their pre-expansion and before they are molded into the final foam articles. For this purpose, a number of degradation treatment options are disclosed for application during bead pre-expansion, including heating the beads by circulation with heated air, admixture of the beads with ozone, aromatic ketones such as acetophenone and benzophenone, and metallic salts, as well as irradiation of the expanding beads with uv radiation (e.g of a wavelength of about 260 nanometers). As a result of the interposed degradation treatment, the foam products degrade first into individual beads, and subsequently into polymeric dust, at a rate that depends upon the intensity of the degradation treatment that is selected.

49 Claims, 3 Drawing Sheets

DEGRADATION OF EXPANDABLE POLYMER BEAD PRODUCTS

CROSS-REFERENCE TO RELATED APPLICATION

The present application is related to U.S. patent application Ser. No. 091/696,442, filed on Oct. 25, 2000, to Algis P. August et al, entitled "Dry Expansion Of Expandable Polymer Beads", (Docket US-DPEP), which is incorporated herein by reference.

BACKGROUND OF THE INVENTION

This invention relate to degradation of products (including foam containers, such as foam coffee cups, and shaped packaging inserts for protection of electronic devices during shipment) formed from beads of expandable polymers, such as expandable polystyrene (EPS).

From an environmental viewpoint, a problem is created when such foam articles are discarded, because they have little tendency to degrade and ultimately disintegrate into beads or finer polymeric dust particles. It is believed that the undesireable cohesion of this plastic waste, in spite of the impact of solar radiation and other natural forces, arises for two reasons.

Firstly, a typical discarded foam article, such as a foam coffee cup, has integrity in the sense that sunlight reaches only the outermost portions of those beads which cover the outer surfaces of the foam article. In other words, polymer beads within the walls or other structures of the foam article, as well as inward-facing surfaces of outer beads (that define the outer surfaces of such foam article structures) are shielded from any potential degradation effects of direct solar radiation by the exposed outermost surface portions of those outer surface beads. Secondly, the solar radiation itself is not of the optimum wavelength for the promotion of polymeric disintegration. As is well known, the maximum intensity of natural solar radiation is about 290 nm (nanometers) to 330 nm by contrast, polystyrene degradation is most responsive to a electromagnetic radiation at a wavelength of approximately 260 nm (nanometers).

To deal with the first (shielding) of these difficulties, it is instructive to first understand the two available methods of pre-expansion (partial expansion) of polymer beads, such as EPS beads, As is well known, pre-expansion (partial expansion) of EPS beads is a preliminary step in the manufacture of various articles, such as foam coffee cups, insulating coolers, shape-molded packing for electronic products and the like. For this purpose, pre-expanded polymer beads are introduced into a mold through a filling valve. Within the the mold, the loosely packed beads are caused to expand further until they largely fill the space between the beads and mold surface as well as the spaces between the beads, thereby forming the manufactured article, which can be removed from the mold after cooling. Such processing is disclosed in prior art publications, such as U.S. Pat. No. 3,897,899 issued to Schuff et al on Aug. 5, 1975.

For over 25 years, pre-expansion of EPS beads has been carried out by the first method of pre-expansion—using steam to provide the thermal energy to soften the unexpanded EPS crystal beads which contain a blowing agent such as pentane. Because steam is an efficient carrier of calories of thermal energy per unit mass, when intermixed with the crystal beads, it causes desirably rapid expansion thereof into much larger pre-expanded beads, each of which comprises a number of hollow cells. Each cell is formed of polymer cell walls, containing somewhat expanded pentane as well as water droplets from condensed steam. After a typically brief cooling period of less than an hour (to set the beads in their pre-expanded state) and a suitable "conditioning" period, the pre-expanded beads are next introduced into a mold for formation of a finished article. Conditioning also allows some of the pentane and condensed water vapour to escape through the cell walls to the surrounding atmosphere.

The purpose of the conditioning period (typically 8 to 24 hours) is both to allow the internal pentane pressure within cells and the atmospheric pressure to reach a steady state equilibrium (with concomitant increase in density) as well as to dry the pre-expanded beads sufficiently that condensed water vapour on the surfaces of these beads no longer agglomerates them into lumps that may not easily pass through the filling valve used in filling the mold or may not flow into corners and narrow spaces of the mold itself. Moreover, this conditioning period advantageously permits some of the water droplets (from condensed steam), that are inside the cells to escape through the cell walls thus drying the insides of the beads. Without inside drying, the trapped water droplets sometimes induce local non-uniformities in the molding of articles (e.g. holes in coffee cups) because each droplet requires longer heating to vapourize it before heating and expansion of the surrounding cell can progress. However, care must be taken that the conditioning period is not too long, as too much of the remaining blowing agent (e.g. pentane) may be lost by diffusion out of the cells of the pre-expanded beads, resulting in pre-expanded EPS beads that no longer have the ability to expand further when they are heated during molding. When the beads do not expand sufficiently during molding, the molded products tend to be poorly fused, and often crumble into pieces or, in the case of coffee cups, leak their contents. Thus, proper conditioning of EPS beads pre-expanded by the steam method has been a delicate balance between a sufficiently long time needed to dry the condensed steam introduced during pre-expansion, and a sufficiently short time to retain an adequate amount of blowing agent (e.g. pentane) within the pre-expanded beads.

As disclosed in our co-pending patent application entitled "Dry Expansion Of Expandable Polymer Beads" (Docket US-DPEP), it is now believed that the steam pre-expansion method functions by having the steam penetrate the crystal beads to carry a large thermal effect rapidly into the interior of each bead, where the steam condenses into water vapour, giving up most of its thermal energy by this change of state (at about 540 calories per gram of steam). In other words, it is the penetration of steam into the bead that allows efficient pre-expansion and formation of hollow cells containing thus-expanded pentane as well as water droplets from condensed steam, but this also causes the penetrated steam to condense into water vapor that is now deeply lodged within the cellular structure of each pre-expanded bead. Moreover, the interior cells near the center of each bead will be expanded by the thermal action of penetrated steam upon interior inclusions of blowing agent (e.g. pentane), thereby creating cells containing pentane which have thin interior cell walls that allow greater loss of pentane. This, in turn, gives rise to the delicate balancing required to maintain a conditioning period of the correct length.

According the second method for pre-expansion of EPS beads as disclosed in the aforementioned copending patent application, there is disclosed the use of a less thermally efficient transfer medium in the form of a dry heated gas, such as air, to more slowly pre-expand the crystal polymer beads. It is believed that the use of hot, dry (low water moisture content) air as a media for transferring heat to the crystal beads causes the beads to heat up from the surface towards the center. Due to this slower action by the heated air, which does not readily carry calories into the interior cell structure of the crystal beads (as compared to steam, which provides most of its calories by change of state, rather than conduction), a conductive type of heating of the bead takes place. Dry heated air, which provides no latent heat of condensation (unlike the 540 calories per gram provided by steam), only transfers about 0.24 calories per gram per degree Celsius of temperature difference between the EPS bead and the heated air. It is believed that the outer layer of each bead is first heated by the hot air and that layer by layer the heat penetrates conductively inwardly (both by infrared radiation and by permeation of dry heated air inward from peripheral toward interior cells, together hereinafter sometimes called "conductive heating"), thereby forming a more pre-expanded structure (with thinner cell walls) on the peripheral (i.e. outer) surface of each bead, and a less expanded structure (with thicker cell walls) at the interior (e.g. center) of each bead. As a result, the pre-expanded beads produced by air heating, contain a higher percent content of blowing agent (e.g. pentane) since it is locked within the interior cells of each bead by their surrounding thick walls of material which have not yet been heated by slow thermal conduction as much as the thin-walled peripheral (outer) cells. The resulting pre-expanded beads are advantageously very dry and can be used immediately in molding of containers and other EPS foam articles due to excellent flow characteristics and excellent expansion capability (due to high pentane content). Thus, the second ("dry air") pre-expansion method of our aforementioned copending patent application permits one to optionally dispense with the conditioning step in the preparation of EPS material for molding of foam articles. While degradation, according to the present invention, is applicable to both steam and dry air pre-expansion methods, it is preferable to work with the dry air method.

SUMMARY OF THE INVENTION

A key realization of the present invention is that the pre-expansion step provides an unexpected opportunity to cause foam product degradation by treating the expandable polymer beads during their pre-expansion. The objective of this degradation treatment is to initiate degradation of at least the surfaces of individual beads during their pre-expansion and before they are molded into the final foam articles using known expandable polymer bead (e.g. EPS polystyrene bead) molding processes.

A further realization of the present invention is that the degradation of polymer beads can be not only caused directly by suitable treatment steps carried out during bead pre-expansion, but that treatment during bead pre-expansion can render the pre-expanded beads susceptible to subsequent exposure to natural forces, such as solar radiation, by shifting their degradation sensitivity from short to longer wavelength ultraviolet radiation. For example, in the case of EPS beads, it is an objective of the present invention to shift the normal peak degradation sensitivity of polystyrene at about 260 nm to over 290 nm, so that natural radiation from the sun can further degrade the pre-expanded EPS beads and foam articles (e.g. styrofoam coffee cups) that are, regrettably, discarded in the open environment.

Accordingly, the present invention broadly provides a method of expanding beads of expandable polymer, each bead comprising a mixture of polymer and a blowing agent, said polymer comprising molecules of high molecular weight, said method comprising the steps of;

a) heating a quantity of dry gas (e.g. air),
b) maintaining the heated dry gas in contact with said beads until substantially every bead is enlarged to a desired degree due to thermal expansion (primarily by conductive heating and without substantial condensation of the heated gas) of said blowing agent therein to form a plurality of both peripheral and interior, mutually joined, cells, each cell comprising said polymer and a quantity of blowing agent therein,
c) during step b), treating said beads to initiate degradation of at least some of said molecules of high molecular weight into molecules of lower molecular weight, and
d) cooling the enlarged beads (as by terminating further contact thereof with the heated dry gas) to set said cells thereof in an enlarged state thereof While the invention may be applied to beads of any expandable polymer, polystyrene with pentane as the blowing agent is preferred. because it is in very widespread use for as expanded EPS beads in "bean bag" chairs and in molded foam articles such as shaped packaging inserts (e.g. for it appliances) and foam containers (e.g. coffee cups).

According to a first embodiment of the invention, step c) of treating said beads comprises mixing a quantity of an aromatic ketone with said beads. For this purpose, suitable aromatic ketones include acetophenone and benzophenone preferably in a concentration of between 1% and 5% by weight of the beads.

In order to help initiate degradation of the beads mixed with an aromatic ketone, it is desirable to irradiate the EPS beads for a selected time period (e.g. exceeding one hour and preferably between 12 and 24 hours) with ultraviolet electromagnetic radiation of a wavelength in the range of 250 nm to 375 nm, and preferably 290 nm to 375 nm, which is substantially the range of wavelengths for natural solar radiation. In the case of acetophenone, the wavelength range of such radiation is preferably 310 nm to 330 nm. For benzophenone, the preferred range is 355 nm to 375 nm.

According to a second embodiment of the invention, step c) of treating said beads comprises heating the EPS beads during step b) to a temperature in the range of 100 to 200 degrees Celsius for a time period of at least 10 minutes, while exposing the beads to air. Preferably, the temperature is in the range of 150 to 170 degrees Celsius, and the time period is at least 5 minutes (e.g. 15 to 25 minutes).

According to a third embodiment of the invention, step c) of treating the beads comprises: circulating a gas comprising ozone through the beads. Preferable, this should be done by circulating a gas comprising ozone and heated air at the bottom of a chamber, and then introducing a batch quantity of said beads into the chamber while circulating ozone-enriched air therein to stir the beads. It is believed that the ozone-enriched air or other gas is able to diffuse through the cell walls of pre-expanded beads, exchanging partially with pentane, and can thus initiate degradation of the polystyrene in the interior cells of the beads. Such diffusion is believed to be particularly effective for the dry air pre-expansion method of aforementioned copending application (Docket US-DPEP) which is discussed hereinabove because these beads are dry and because their peripheral cells substantially surround and are substantially larger than interior cells Preferably, in addition to such ozone treatment, the beads should be heated during step b) to a temperature in the range of 100 to 200 degrees Celsius (e.g. about 150–170 degrees Celsius) for a time period of at least 5 minutes (e.g. 15–25 minutes). To help initiate the desired degradation of the beads it is also desirable to irradiate the beads during ozone treatment for at least one hour with ultraviolet electromagnetic radiation of a wavelength in the range of 250 nm to 375 nm, and especially in the range of 310 nm to 330 nm.

According to a fourth embodiment of the invention, step c) of treating the beads comprises irradiating them with ultraviolet electromagnetic radiation of a wavelength in the range of 250 nm to 270 nm (the wavelength range of maximum susceptibility for polystyrene) to help initiate degradation of the EPS beads.

As will be understood, step c) may be carried by any combination of the four treatment methods set forth hereinabove, as well as of known methods for initiating or enhancing degradation. The chemistry of known methods of polymer degradation is discussed in a number of publications, such as Chapter 7, pages 207–227, by G. Geuskens, of "Developments In Polymer Degradation - 3", edited by N. Grassie, 1981, Applied Science Publishers, Essex, England, and pages 194–195 of "Polymer Degradation And Stabilisation", N. Grassie and G. Scott, 985, Cambridge University Press.

As will also be understood, if the treated beads or molded foam articles (e.g. containers such as coffee cups) are subsequently discarded, then ambient solar radiation will continue to degrade the beads into polystyrene powder (and the foam articles first into beads, which subsequently degrade into polystyrene powder). The resultant degraded beads and polystyrene powder are then susceptible to further degradation by naturally occurring microorganisms until they no longer visually pollute the environment.

The present invention also provides a method of molding articles from beads of expandable polymer, each bead comprising a mixture of polymer and a blowing agent, said polymer comprising molecules of high molecular weight, said method comprising the steps of, a) heating a quantity of dry gas,
b) maintaining the heated dry gas in contact with said beads until substantially every bead is enlarged to a desired degree due to thermal expansion of said blowing agent therein to form a plurality of both peripheral and interior, mutually joined, cells, each cell comprising said polymer and a quantity of blowing agent therein, by:
   i) circulating heated dry gas at the bottom of a chamber, and
   ii) then introducing a batch quantity of said beads into said chamber while circulating said heated gas therein to stir said beads,
c) during step b, treating said beads to initiate degradation of at least some of said molecules of high molecular weight into molecules of lower molecular weight, and
d) cooling said beads to set cells thereof in an enlarged state thereof to thereby form pre-expanded beads,
e) introducing said pre-expanded beads into a mold defining a shape of an article, and
f) heating said pre-expanded beads in said mold to further expand said pre-expanded beads to form said article. As will be understood, step c) may be carried by any combination of the four treatment methods set forth hereinabove, as well as of known methods for initiating or enhancing degradation. Of course, where the molded articles are intended for use as food or drink containers (e.g. coffee cups) then a suitable choice must be made among any of the additives discussed hereinabove. Thus, in the case of the first embodiment for treatment of EPS beads during pre-expansion, a suitable aromatic ketone (such as acetophenone, which is normally used as a food additive) should be chosen.

The present invention also provides an apparatus for expanding beads of expandable polymer, such as polystyrene, said apparatus comprising:

a) a vertical expansion chamber for receiving a selected batch quantity of said beads, said expansion chamber comprising a lower portion and an upper portion, said lower portion being formed of substantially gas-impermeable material, said upper portion being formed of substantially gas-permeable material,
b) a loading bin for discharging said selected batch quantity of beads into said lower portion,
c) a source of dry, heated, pressurized gas (preferably air) connected in gas-communicating relationship with said lower portion said source being operable to direct the heated gas into said lower portion to stir and percolate through said selected batch quantity of beads therein, and
d) a degradation device operable to treat said beads to initiate degradation of at least some of said molecules of high molecular weight into molecules of lower molecular weight.

According to one embodiment of the novel apparatus, the degradation device (d) comprises a source of ozone connected in gas-communicating relationship with the aforesaid lower portion, the ozone source is operable to direct the heated gas into the aforesaid lower portion to percolate through said selected batch quantity of beads therein According to a second embodiment of the novel apparatus, degradation device (d) comprises a source of ultraviolet electromagnetic radiation of a wavelength in the range of 250 nm to 375 nm, the source of ultraviolet electromagnetic radiation being disposed within the aforesaid lower portion and being operable to irradiate said selected batch quantity of beads therein.

Preferably, gas source (c) comprises a hot air blower having an output nozzle directed away from a vertical central axis of said lower portion of said expansion chamber to enhance circumferential stirring of beads around the vertical axis of the aforesaid lower portion.

The apparatus desireably further comprises a sensor operable to detect a selected level of expanded beads within said expansion chamber, said apparatus further comprising a discharge outlet in the aforesaid lower portion of said expansion chamber, said discharge outlet being openable to discharge expanded beads upon detection of said selected level by said sensor.

As a novel product, the present invention further provides a partially expanded bead of expandable polymer (such as EPS), said bead having an outer surface, said polymer comprising molecules of high molecular weight, said pre-expanded bead comprising a plurality of both peripheral and interior, mutually joined, cells, each cell comprising a cell wall of said polymer and a quantity of blowing agent (e.g. pentane) enclosed thereby, wherein the peripheral cells substantially surround and are substantially larger than the interior cells, and wherein at least said outer surface (e.g. to a depth of 5 micrometers or more) of said bead exhibits degradation of said molecules of high molecular weight into molecules of lower molecular weight. Preferably, cell walls of interior cells are characterized by a greater thickness than cell walls of peripheral cells. Typically, after prolonged exposure to ambient sunlight, the aforesaid outer surface of the novel bead exhibits a yellowed appearance and feels powdery to the touch. Novel degradation-treated beads of this kind can be used in bead bag furniture, as loose packing material, and the like. They can also be used, if onluy partially pre-expanded, to form molded articles.

The present invention also provides an article formed from partially expanded beads of expandable polymer (e.g. EPS), each bead having an outer surface, said polymer comprising molecules of high molecular weight, said pre-expanded bead comprising a plurality of both peripheral and interior, mutually joined, cells, each cell comprising a cell wall of said polymer and a quantity of blowing agent (e.g. pentane) enclosed thereby, wherein the peripheral cells substantially surround and are substantially larger than the interior cells, and wherein at least said outer surface of said bead exhibits degradation of said molecules of high molecular weight into molecules of lower molecular weight. Preferably, cell walls of interior cells are characterized by a greater thickness than cell walls of said peripheral cells. Typically, after prolonged exposure to ambient sunlight, the novel article (e.g. foam coffee cup) is brittle and its outer surface exhibits a yellowed appearance and feels powdery to the touch.

BRIEF DESCRIPTION OF THE DRAWINGS

The foregoing discussion will be understood more readily from the following detailed description of the invention and preferred embodiments thereof, when taken in conjunction with the accompanying drawings, in which:

FIG. 2b is an enlarged view of the encircled portion of a wall of the molded article shown in FIG. 2a.

DETAILED DESCRIPTION

Figure 1A:
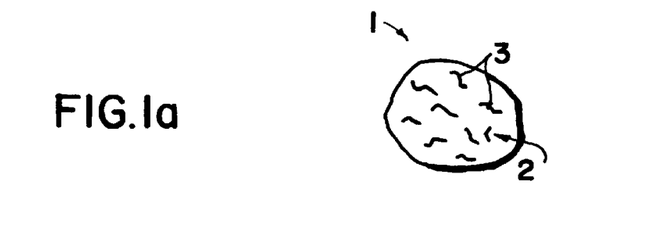
FIG. 1a is a schematic cross-sectional representation of an unexpanded bead of expandable polystyrene (EPS), in accordance with the prior art.

FIG. 1a shows an unexpanded ("crystal") bead 1 of expandable polymer. In the case where the polymer is polystyrene, such beads are typically called "EPS" (expandable polystyrene) beads and are available from a number of commercial sources; for example, EPS beads are sold under the designation F271T by Nova Chemicals Inc. of Moon Township, Pa., USA. While the preferred embodiment will be discussed with reference to polystyrene EPS beads, it should be understood that beads of other polymers, such as polyethylene, may be employed in carrying out the invention (see U.S. Pat. No. 3,959,189, issued May 25, 1976 to Kitamori).

Referring again to FIG. 1a, raw unexpanded bead 1 comprises a polystyrene material 2 intermixed with distributed deposits of a blowing agent such as pentane 3. As will be understood, numerous blowing agents may also be used, such as isopentane and n-pentane. Again, where a different polymer is used, such as polyethylene, as in Kitamori's U.S. Pat. No. 3,959,189 (supra), the blowing agent may be n-butane.

Figure 1B:
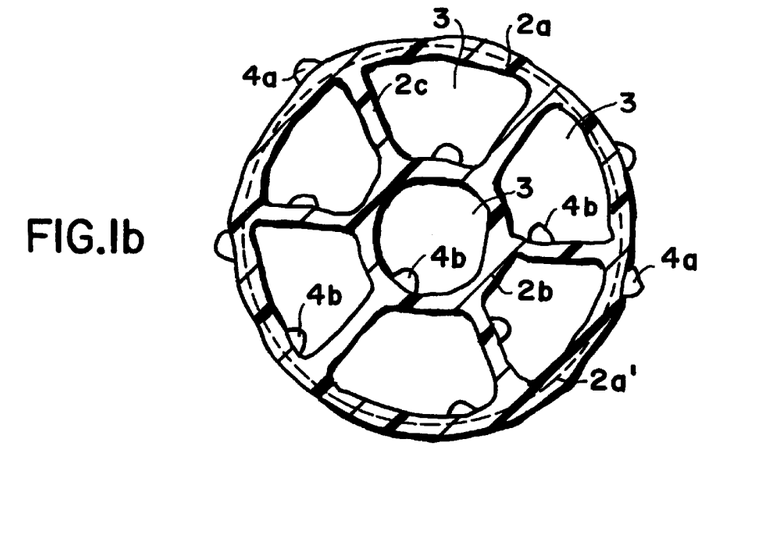
FIG. 1b is a schematic cross-sectional representation of a pre-expanded (partially expanded) bead of expandable polystyrene, in accordance with the prior art steam pre-expansion method.

FIG. 1b illustrates a prior art pre-expanded EPS bead after expansion with steam, which provides heat rapidly to the bead 1 by releasing approximately 540 calories of thermal energy per gram of steam as it condenses to form water droplets 4a on the exterior periphery of bead 1 and water droplets 4b within the interior of bead 1. The heat causes expansion of pentane 3 to cause formation of a number of both peripheral cells and interior, mutually joined cells, surrounding quantities of expanded pentane 3 and water droplets 4b, created by condensation of steam which has permeated by convection thereof through the polymer material of bead 1. As illustrated in FIG. 1b, peripheral cells have outer cell walls 2a and inner cell walls 2c, while interior cells have cell walls 2b. Because steam is effective to permeate throughout bead 1, both peripheral and interior cells are expanded to a similar degree, whereby peripheral cell walls 2a are of approximately the same thickness as interior cell walls 2b. Moreover, it is believed that much of the pentane 3 escapes from both both peripheral cells and interior cells during the conditioning period of many hours because of the substantially uniform thinness of all cell walls 2a and 2b. Of course, as pentane 3 escapes during conditioning, the ability of pre-expanded bead 1 to further expand (during formation of a coffee cup or other molded article) is greatly reduced. As explained earlier herein, the conditioning period is necessary to dry the bead until most of the exterior water droplets 4a have evaporated, in order to reduce the agglomeration of beads to an acceptable degree. However, because cell walls 2a, 2b act as barriers to the escape of water vapor, many interior water droplets 4b remain trapped within cells of bead 1 despite drying over an extended conditioning period. It is these interior water droplets 4b which are believed to cause subsequent problems during product molding, when they must first be sufficiently heated to their evaporation point in order to allow adjacent trapped pentane 3 to be sufficiently heated to expand adjacent polystyrene material of the surrounding cell walls 2a, 2b.

The aforementioned dry air pre-expansion method of copending patent application entitled "Dry Expansion Of Expandable Polymer Beads"(Docket US-DPEP) has been based on the foregoing understanding of the mechanisms involved in EPS bead pre-expansion. In particular, it has been realized that it is essential to reduce the presence of water droplets 4b in order to correspondingly reduce the occurrence of serious product defects due to local failures of beads to expand during molding of coffee containers and other articles, resulting in leaky cups and a dull, blemished surface appearance. As will be understood, these defects arise because of a combination of loss of pentane needed to fully expand the pre-expanded beads during product molding, and more directly because water interior water droplets 4b prevent uniform heating and expansion because they absorb heat needed for local expansion of pentane.

Moreover, while the quantity of exterior water droplets 4a can be reduced by drying during the conditioning period (to thereby reduce clumping of pre-expanded beads and sieving them for wasteful discard to reduce subsequent dogging of molds and their filling valves), such conditioning causes much loss of pentane, which undesireably prevents full expansion of the pre-expanded beads during product molding.

Figure 1C:
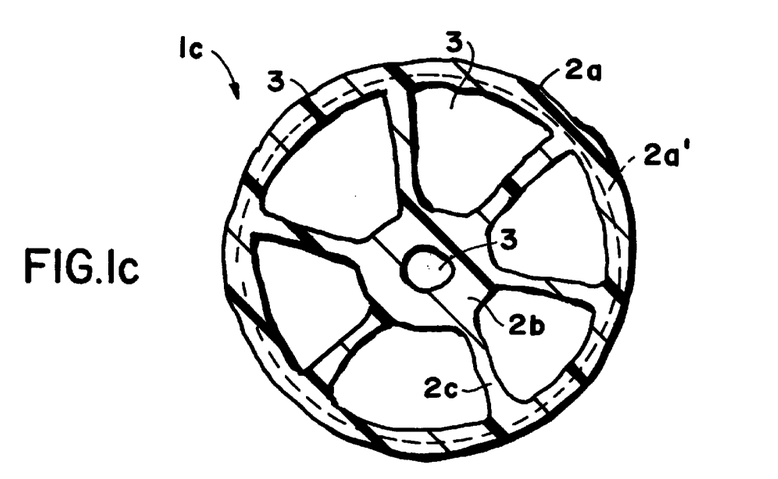
FIG. 1c is a schematic cross-sectional representation of a pre-expanded (partially expanded) bead of expandable polystyrene, in accordance with the the dry air pre-expansion method of our aforementioned copending application (Docket US-DPEP)

Because of these realizations, the aforementioned dry air pre-expansion method of the aforementioned copending patent application provides a solution that utilizes a heated dry gas to expand EPS and other expandable polymer beads, not only to pre-expand beads prior to final expansion during shaped product molding, but also to expand EPS beads to their fully expanded state (as typically used for filling "bean" bag furniture). By contrast with the prior art use of the heat released by steam condensation to permeate and rapidly transfer heat to expand EPS beads, the dry air acts primarily by conduction to more slowly heat the beads. In fact, as is well known, a gram of heated air can transfer only about one calorie of thermal energy for each degree of temperature difference between the air and the EPS beads, a reason why bead pre-expansion has been rigidly fixated on the use of steam. As a result of such conductive heating, the dry air pre-expanded bead of FIG. 1c shows that peripheral deposits of pentane 3 (and their enclosing peripheral cells and peripheral cell walls 2a) are expanded first, while the pentane 3 enclosed within interior cells (and their defining interior cell walls 2b) are expanded last. Where, as in FIG. 1c, the expansion is stopped to form a pre-expanded bead before expansion of interior cells (by conductive heating) is complete, then peripheral cells are substantially more expanded (with thinner cell walls 2a) than interior cells (with thicker cell walls 2b). The thicker interior walls form a greater barrier to escape of the blowing agent (pentane 3) during conditioning, and otherwise, than the barrier formed by thinner polystyrene cell walls 2a of peripheral cells. As a result, the dry air pre-expanded bead of FIG. 1c, because of the greater amount of pentane 3 retained within its thick-walled interior cells, retains a greater capability for further expansion during use in subsequent molding of coffee cups and other products than the prior art pre-expanded bead of FIG. 1b (whose interior cells have thin cell walls 2b). Moreover, because the gas used for heating is dry, far fewer (if any) condensed water droplets should be created within the bead cells of FIG. 1c than FIG. 1b, thereby permitting superior bead fusion and surface appearance after subsequent molding of the pre-expanded beads into finished products.

In the context of the aforementioned pre-expansion method of copending application (Docket US-DPEP), a dry gas shall be understood to mean a gas that has a low water moisture content. Otherwise, any suitable gas, such as air, may be used for heating EPS beads during expansion. Obviously, toxic and otherwise noxious gases should not be chosen as heating gases.

In order to cause degradation of expanded polymer beads and articles (such as coffee cups) formed therefrom, the present invention proposes to intervene in the above-described pre-expansion process to treat the beads, while their surfaces are still accessible, to initiate degradation (as indicated by dotted line 2a' in FIG. 1b and FIG. 1c) and cause the beads to be susceptible to continued degradation due to the later influence of natural forces, such as natural solar radiation (at wavelengths of 290 nm to 375 nm), mechanical abrading, and naturally occurring biological microorganisms. According to preferred embodiments of the invention, a number of specific degradation treatments are disclosed herein as discussed hereinabove, which may be used individually or in combination, depending on the degree and rate of degradation that may be desired. As will be understood, a very high rate of degradation is not necessarily desireable in cases of foam articles such as coffee cups because they could disintegrate and leak their contents after a warehousing period of several months. In the coffee cup example, it may therefore be desireable to adjust the degradation rate to achieve disintegration into individual beads only after a period of, for example, one year of exposure to solar radiation and other natural forces. Such adjustment must necessarily be left to the practitioners of the present invention who, without undue experimentation will select the appropriate degree of degradation treatment during EPS bead pre-expansion in accordance with the desired degree of deterioration of beads.

By use of the expansion apparatus of FIG. 3a, which is described hereinbelow, various of the disclosed degradation treatments may be conveniently applied to the EPS beads during the pre-expansion stage. It is believed that these treatments (e.g. absorption of ozone, aromatic ketones, metal salts, short wavelength uv radiation, thermal processing, etc. ) have an initial degradation effect that penetrates through the outer surface of cell walls 2a of beads 1b and 1c to at least a level indicated by dotted lines 2a'. Moreover, it is believed that this initial degradation effect penetrates further through cell walls 2a, 2b, 2c into the interior cells of beads 1b, 1c. In the case of treatment with ozone ( $O_3$), the ozone molecules diffuse through cell walls 2a, 2b, 2c and are believed to cause scission of at least some of the high molecular weight polystyrene molecules throughout beads 1b, 1c into monomers and other molecules of lower molecular weight.

Figure 2A:
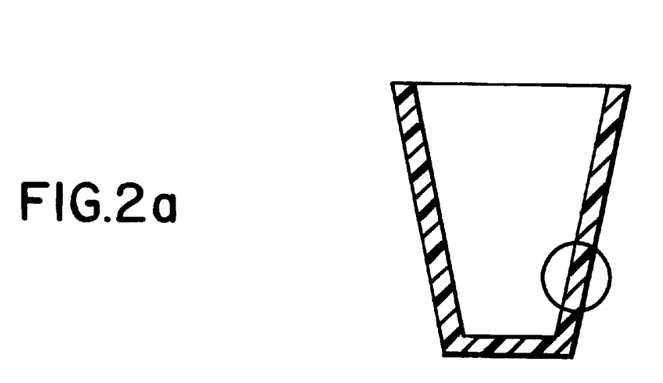
FIG. 2a is a schematic cross-sectional view of a molded article according to the present invention.
Figure 2B:
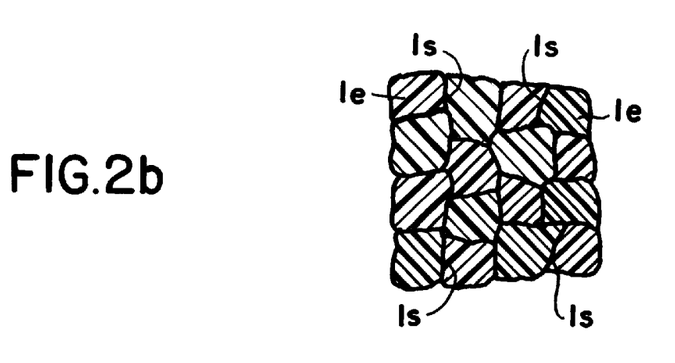
Figure 2C:
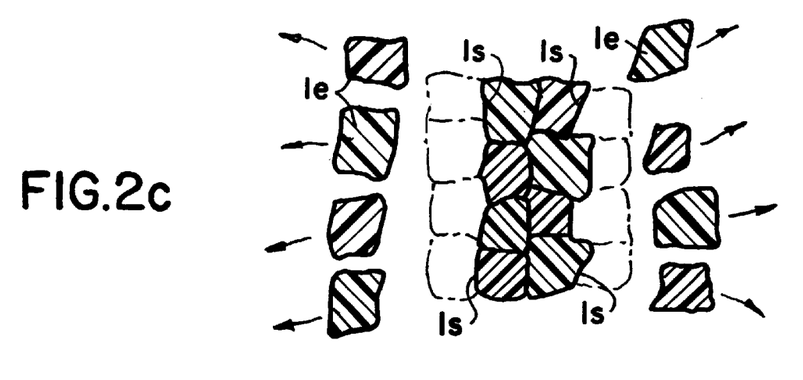
FIG. 2c is another view of the encircled portion of a wall of the molded article shown in FIG. 2a, depicting the deterioration of the article due to continuing degradation of surfaces of its constituent beads as a result of continuing exposure to natural sunlight and other environmental influences.

Subsequent exposure of the treated beads (and foam articles made from them ) to solar radiation is believed to extend their degradation until they become yellow and deteriorate. Samples of foam coffee cups formed from degradation-treated beads have, in fact, not only turned yellow and brittle but have readily disintegrated into individual beads 1e as illustrated in FIGS. 2a, 2b, 2c due to degradation at bead surfaces 1s. Moreover, such cups and degrading beads have felt powdery to the touch, indicating that the beads themselves were degrading into styrene monomers and shortened polymer molecules.

Figure 3A:
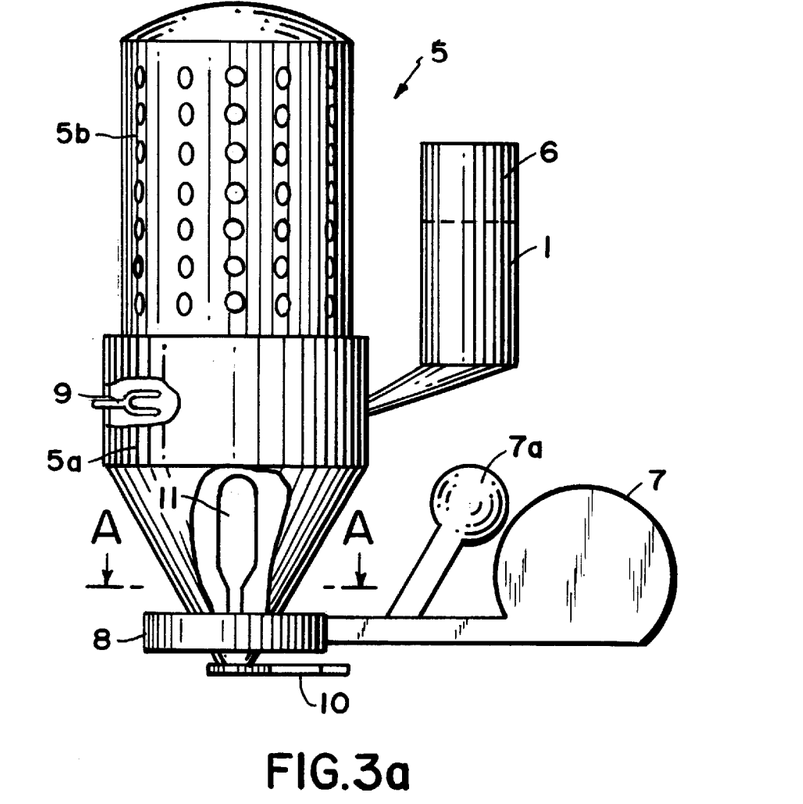
FIG. 3a is a schematic cross-sectional view of an apparatus for expanding and initiating degradation of beads of expandable polystyrene, in accordance with the present invention.
Figure 3B:
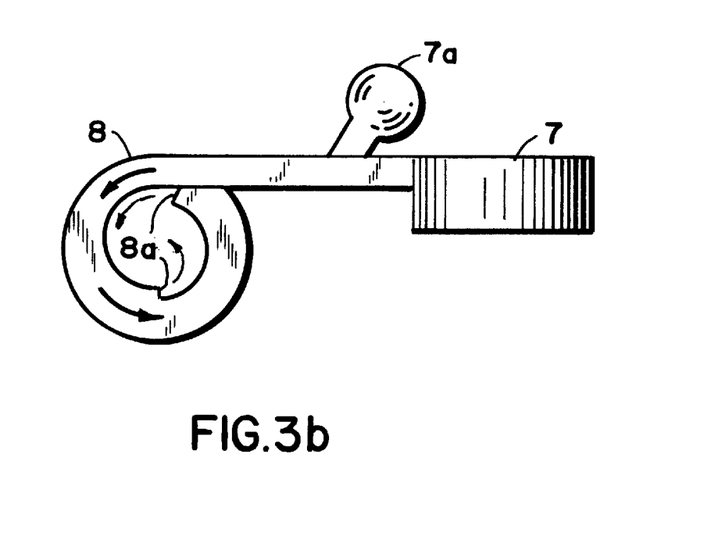
FIG. 3b is a schematic view of the apparatus of FIG. 2a, taken along section A-A thereof.

FIG. 3a and FIG. 3b show a novel apparatus in accordance with the present invention which may be used for expanding beads of expandable polymer (e.g. polystyrene, polyethylene, or the like). The aforesaid apparatus includes a vertical expansion chamber 5 for receiving a selected batch quantity (e.g. 10 kg.) of EPS or other polymer beads from a loading bin 6. According to the present invention, additives such as aromatic ketones (e.g. acetophenone) and metal salts (e.g. zinc stearate) are admixed into this batch quantity of EPS beads. Expansion chamber 5 includes both a lower portion 5a and an upper portion 5b. The expansion apparatus includes a source, in the form of hot air blower 7 of dry heated, pressurized gas (e.g. air at 510 cubic feet per minute) which is connected in gas-communicating relationship with the bottom of lower portion 5a by means of nozzles 8a projecting into lower portion 5a from a doughnut-shaped collar 8. The air from blower 8 is typically at a low pressure (e.g. corresponding to a water column of 5 inches) and may be heated by blowing it over a heat exchanger (not shown) whose thermal energy is supplied by the least costly local energy source, such as natural gas.

In the apparatus shown in FIGS. 3a, 3b, the degradation device includes a source 7a of ozone as well as a source 11 of ultraviolet (UV) electromagnetic radiation. Source 7a may, for example, be a corona discharge ozone generator such as the Pro 10000 ozone generator which is available from the Air Zone Corporation of Leesburg, Va., USA. Depending on the desired range of wavelengths, UV source 11 may be a low pressure mercury lamp (for wavelengths of peak intensity at 254 nm, approximately the maximum absorption band for pure polystyrene). Such a low pressure mercury lamp is available as part of the Pen-Ray Lamp line offered by UVP, Inc of Upand, Calif., USA. Moreover, a number of lamps containing mercury, zinc, cadmium and other substances are characterized by various peak intensity spectral lines in the range of 250–375 nm and are available from UVP Inc as well as other manufacturers. Moreover, filtered xenon arc lamps can be used in the 295–340 nm range, while carbon arc lamps are suitable in the 340–375 nm range.

Preferably, lower portion 5a of the apparatus of FIG. 3a is formed of stainless steel or other substantially gas-impermeable material to keep the heated air from escaping from chamber 5 until it has thoroughly stirred and percolated through the batch quantity of EPS beads at the bottom of lower portion 5a to conductively heat the beads until they begin to expand, with outer peripheral cells of the beads expanding first and gradually transmitting heat through to the interior cells, which expand less and later. To allow for subsequent escape of the heated air and lost pentane from chamber 5, its upper portion 5b is made of a gas-permeable material, such as stainless steel screening material.

Preferably, hot air blower 7 has an output nozzle directed away from a vertical central axis of the aforesaid expansion chamber in order to cause more vigorous stirring of the beads. As shown in FIG. 2b, blower 7 directs hot air into collar 8 which has nozzles 8a directed tangential to the surface of lower portion 5a. As also shown, ozone source 7a is connected in communication with a duct from hot air blower 7 in order to admix ozone with hot air in a preferred ratio of over 10:50 by volume. Where more rapid degradation is desired, it will be understood that higher concentrations of ozone to air (e.g. 50:50 by volume) may be selected. As a result, the mixture of ozone and hot air can commingle with beads 1 in lower portion 5a to treat the expanding EPS beads with ozone and initiate their degradation as the ozone diffuses through their cell walls. Moreover, the temperature of the hot air is held at about 160 degrees Celsius while it heats the circulating beads for about 20 minutes. It is believed that this heat treatment causes formation of aromatic ketones such as acetophenone within the polystyrene and that solar radiation at 290–375 nm can then be more readily absorbed to effect degradation.

Moreover, the apparatus of FIG. 2a is provided with a sensor 9, capable of detecting a selected level of expanded beads within expansion chamber 5, as well as a discharge outlet 10, which is located at the bottom of lower portion 5a of the expansion chamber. While a variety of suitable sensors may be used, the preferred type is a vibrating level switch ( in the form of a tuning fork) which is available from the Miltronics Manufacturing Inc. of Keene, N.H., U.S.A. As will be understood, the discharge outlet 10 is automatically opened to discharge expanded beads 1 upon detection of the aforesaid selected level by sensor 9.

According to a preferred embodiment of the invention, a batch quantity of beads 1 are mixed with a desired quantity of acetophenone or benzophenone (preferably about 3% to 5% by weight) and optionally a desired quantity of metal salts, such as zinc stearate at about 2% by weight. Each of these ingredients may readily be obtained from a number of commercial suppliers. For Example, benzophenone is available from The Upjohn Company of Kalamazoo, Mich., U.S.A., while zinc stearate is available from Ferro Corporation of Cleveland, Ohio, U.S.A.

This admixed batch quantity of beads 1 is then loaded into bin 6. Hot air blower is turned on and beads 1 are discharged into lower portion 5a from bin 6. Ozone source 7a is turned on in order to admix ozone with hot air in a ratio of about 10:50 (and preferably about 50:50) by volume as they commingle with beads 1 in lower portion 5a to treat the expanding EPS beads with ozone and initiate their degradation as the ozone diffuses through their cell walls. Moreover, the temperature of the hot air is held at about 160 degrees Celsius while it heats the circulating beads for about 20 minutes.

Additionally, uv radiation source 11 may be activated for an hour or more to help initiate polystyrene degradation. While uv radiation at 255–265 nm is well absorbed by pure polystyrene, when an aromatic ketone such as benzophenone has been admixed then uv radiation at 355–-375 nm is more effectively absorbed. Correspondingly, for admixed acetophenone, uv radiation at about 310–330 nm should be used.

After the treated, pre-expanded beads are allowed to cool to the ambient temperature to set the beads (and their cells) in an enlarged state, the beads are next used as is (e.g. for bean bag chairs) or can be used to mold articles, such as coffee cups. In the latter case, the degraded, pre-expanded beads are next introduced into a mold that defines the shape of the cup or other article. Then the pre-expanded beads are heated to cause further bead expansion to form the finished article. As a result of the interposed degradation treatment, the foam products later degrade, first into individual beads, and subsequently into polymeric dust, at a rate (in months or years) that depends upon the intensity of the degradation treatment that is selected.

While the present invention has been described with reference to preferred embodiments thereof, numerous obvious changes and variations may readily be made by persons skilled in the field of expandable polymers. Accordingly, the invention should be understood to include all such variations to the full extent embraced by the claims.

What is claimed is:

1. A method of expanding beads of expandable polymer, each bead comprising a mixture of polymer and a blowing agent, said polymer comprising molecules of high molecular weight, said method comprising the steps of;
   a) heating said beads until substantially every bead is enlarged to a desired degree due to thermal expansion of said blowing agent therein to form a plurality of cells, each cell comprising said polymer and a quantity of said blowing agent therein,
   b) during step a), treating said beads to initiate degradation of at least some of said molecules of high molecular weight into molecules of lower molecular weight, and
   c) cooling the enlarged beads to set said cells thereof in an enlarged state thereof.

2. A method of expanding beads of expandable polymer, each bead comprising a mixture of polymer and a blowing agent, said polymer comprising molecules of high molecular weight, said method comprising the steps of;
   a) heating a quantity of dry gas,
   b) maintaining the heated dry gas in contact with said beads until substantially every bead is enlarged to a desired degree due to thermal expansion of said blowing agent therein to form a plurality of both peripheral and interior, mutually joined, cells, each cell comprising said polymer and a quantity of blowing agent therein,
   c) during step b), treating said beads to initiate degradation of at least some of said molecules of high molecular weight into molecules of lower molecular weight, and d) cooling the enlarged beads to set said cells thereof in an enlarged state thereof.

3. A method as set forth in claim 2, said expandable polymer comprising expandable polystyrene, said gas comprising air, and said blowing agent comprising pentane.

4. A method as set forth in claim 3, wherein step c) of treating said beads comprises mixing a quantity of an aromatic ketone with said beads.

5. A method as set forth in claim 4 wherein said quantity of aromatic ketone comprises acetophenone in a concentration of between 1% and 5% by weight of said beads.

6. A method as set forth in claim 4, wherein said quantity of aromatic ketone comprises benzoophenone in a concentration of between 1% and 5% by weight of said beads.

7. A method as set forth in claim 4, wherein step c) of treating said beads further comprises irradiating said beads for a selected time period with ultraviolet electromagnetic radiation of a wavelength in the range of 250 nm to 375 nm.

8. A method as set forth in claim 5, wherein step c) of treating said beads further comprises irradiating said beads for a selected time period with ultraviolet electromagnetic radiation of a wavelength in the range of 310 nm to 330 nm.

9. A method as set forth in claim 6, wherein step c) of treating said beads further comprises irradiating said beads for a selected time period with ultraviolet electromagnetic radiation of a wavelength in the range of 355 nm to 375 nm.

10. A method as set forth in claim 7, wherein said selected time period exceeds one hour.

11. A method as set forth in claim 3, wherein step c) of treating said beads comprises heating said beads during step b) to a temperature in the range of 100 to 200 degrees Celsius for a time period of at least 5 minutes, while exposing said beads to air.

12. A method as set forth in claim 11, said temperature is in the range of 150 to 170 degrees Celsius, and said time period is 15 to 30 minutes.

13. A method as set forth in claim 3 wherein step c) of treating said beads comprises:
circulating a gas comprising ozone through said beads.

14. A method as set forth in claim 13, wherein step c) further comprises heating said beads during step b) to a temperature in the range of 50 to 200 degrees Celsius for a time period of at least 5 minutes.

15. A method as set forth in claim 13, wherein step c) of treating said beads further comprises irradiating said bead for at least one hour with ultraviolet electromagnetic radiation of a wavelength in the range of 250 nm to 375 nm.

16. A method as set forth in claim 14, wherein step c) of treating said beads comprises irradiating said beads for at least one hour with ultraviolet electromagnetic radiation of a wavelength in the range of 250 nm to 375 nm.

17. A method as set forth in claim 13, said peripheral cells substantially surrounding and being substantially larger than said interior cells.

18. A method as set forth in claim 14, said peripheral cells substantially surrounding and being substantially larger than said interior cells.

19. A method as set forth in claim 15, said peripheral cells substantially surrounding and being substantially larger than said interior cells.

20. A method as set forth in claim 13, wherein steps b) and c) comprise steps of:
i) circulating a gas comprising ozone and heated air at the bottom of a chamber, and
ii) then introducing a batch quantity of said beads into said chamber while circulating said gas therein to stir said beads.

21. A method as set forth in claim 14, wherein steps b) and c) comprise steps of:
i) circulating a gas comprising ozone and heated air at the bottom of a chamber, and
ii) then introducing a batch quantity of said beads into said chamber while circulating said gas therein to stir said beads.

22. A method as set forth in claim 15, wherein steps b) and c) comprise steps of:
i) circulating a gas comprising ozone and heated air at the bottom of a chamber, and
ii) then introducing a batch quantity of said beads into said chamber while circulating said gas therein to stir said beads.

23. A method as set forth in claim 4, wherein step c) of treating said beads comprises mixing a quantity of a metal salt with said beads.

24. A method as set forth in claim 23, wherein said metal salt is zinc stearate.

25. A method as set forth in claim 13, wherein step c) of treating said beads comprises mixing a quantity of a metal salt with said beads.

26. A method as set forth in claim 25, wherein said metal salt is zinc stearate.

27. A method of molding articles from beads of expandable polymer, each bead comprising a mixture of polymer and a blowing agent, said polymer comprising molecules of high molecular weight, said method comprising the steps of;
a) heating said beads until substantially every bead is enlarged to a desired degree due to thermal expansion of said blowing agent therein to form a plurality of both peripheral and interior, mutually joined, cells, each cell comprising said polymer and a quantity of blowing agent therein,
b) during step a), treating said beads to initiate degradation of at least some of said molecules of high molecular weight into molecules of lower molecular weight, and
c) cooling said beads to set cells thereof in an enlarged state thereof to thereby form pre-expanded beads,
d) introducing said pre-expanded beads into a mold defining a shape of an article, and
e) heating said pre-expanded beads in said mold to further expand said pre-expanded beads to form said article.

28. A method of molding articles from beads of expandable polymer, each bead comprising a mixture of polymer and a blowing agent, said polymer comprising molecules of high molecular weight, said method comprising the steps of;
a) heating a quantity of dry gas,
b) maintaining the heated dry gas in contact with said beads until substantially every bead is enlarged to a desired degree due to thermal expansion of said blowing agent therein to form a plurality of both peripheral and interior, mutually joined, cells, each cell comprising said polymer and a quantity of blowing agent therein, by:
i) circulating heated dry gas at the bottom of a chamber, and
ii) then introducing a batch quantity of said beads into said chamber while circulating said heated gas therein to stir said beads,
c) during step b), treating said beads to initiate degradation of at least some of said molecules of high molecular weight into molecules of lower molecular weight, and d) cooling said beads to set cells thereof in an enlarged state thereof to thereby form pre-expanded beads, e) introducing said pre-expanded beads into a mold defining a shape of an article, and f) heating said pre-expanded beads in said mold to further expand said pre-expanded beads to form said article.

29. A method as set forth in claim 28, said expandable polymer comprising expandable polystyrene, said gas comprising air, and said blowing agent comprising pentane.

30. A method as set forth in claim 29, wherein step c) of treating said beads comprises mixing a quantity of an aromatic ketone with said beads.

31. A method as set forth in claim 30, wherein said quantity of aromatic ketone comprises acetophenone in a concentration of between 1% and 5% by weight of said beads.

32. A method as set forth in claim 30, wherein said quantity of aromatic ketone comprises benzoophenone in a concentration of between 1% and 5% by weight of said beads.

33. A method as set forth in claim 30, wherein step c) of treating said beads further comprises irradiating said beads for a selected time period with ultraviolet electromagnetic radiation of a wavelength in the range of 250 nm to 375 nm.

34. A method as set forth in claim 31, wherein step c) of treating said beads further comprises irradiating said beads for a selected time period with ultraviolet electromagnetic radiation of a wavelength in the range of 310 nm to 330 nm.

35. A method as set forth in claim 32, wherein step c) of treating said beads further comprises irradiating said beads for a selected time period with ultraviolet electromagnetic radiation of a wavelength in the range of 355 nm to 375 nm.

36. A method as set forth in claim 33, wherein said selected time period exceeds one hour.

37. A method as set forth in claim 29. wherein step c) of treating said beads comprises heating said beads during step b) to a temperature in the range of 100 to 200 degrees Celsius for a time period of at least 5 minutes while exposing said beads to air.

38. A method as set forth in claim 37, said temperature is in the range of 150 to 170 degrees Celsius, and said time period is 15 to 30 minutes.

39. A method as set forth in claim 29 wherein step c) of treating said beads comprises:

circulating a gas comprising ozone through said beads.

40. A method as set forth in claim 39, wherein step c) further comprises heating said beads during step b) to a temperature in the range of 100 to 200 degrees Celsius for a time period of at least 5 minutes.

41. A method as set forth in claim 39, wherein step c) of treating said beads comprises irradiating said bead for a selected time period with ultraviolet electromagnetic radiation of a wavelength in the range of 250 nm to 375 nm.

42. A method as set forth in claim 40, wherein step c) of treating said beads comprises irradiating said bead for a selected time period with ultraviolet electromagnetic radiation of a wavelength in the range of 250 nm to 375 nm.

43. A method as set forth in claim 41 wherein said selected time period exceeds one hour.

44. A method as set forth in claim 35, said peripheral cells substantially surrounding and being substantially larger than said interior cells.

45. A method as set forth in claim 37, said peripheral cells substantially surrounding and being substantially larger than said interior cells.

46. A method as set forth in claim 43, said peripheral cells substantially surrounding and being substantially larger than said interior cells.

47. A method as set forth in claim 39, wherein said dry gas comprises ozone and air.

48. A method as set forth in claim 40, wherein said dry gas comprises ozone and air.

49. A method as set forth in claim 41, w herein said dry gas comprises ozone and air.

\* \* \* \* \*